US007254573B2

(12) United States Patent
Burke

(10) Patent No.: US 7,254,573 B2
(45) Date of Patent: Aug. 7, 2007

(54) SYSTEM AND METHOD FOR IDENTIFYING ALTERNATE CONTACT INFORMATION IN A DATABASE RELATED TO ENTITY, QUERY BY IDENTIFYING CONTACT INFORMATION OF A DIFFERENT TYPE THAN WAS IN QUERY WHICH IS RELATED TO THE SAME ENTITY

(76) Inventor: Thomas R. Burke, 15 W. 26th St. 9th Fl., New York, NY (US) 10010

( * ) Notice: Subject to any disclaimer, the term of this patent is extended or adjusted under 35 U.S.C. 154(b) by 335 days.

(21) Appl. No.: 10/605,488

(22) Filed: Oct. 2, 2003

(65) Prior Publication Data
US 2004/0133561 A1    Jul. 8, 2004

Related U.S. Application Data

(60) Provisional application No. 60/415,099, filed on Oct. 2, 2002.

(51) Int. Cl.
*G06F 17/30* (2006.01)
*G06K 9/00* (2006.01)
*H04N 1/00* (2006.01)

(52) U.S. Cl. .................. 707/3; 707/1; 707/9; 707/102; 707/200; 379/93.24; 382/101; 358/402

(58) Field of Classification Search ................ 707/1–7, 707/9, 10, 100–102, 200–201; 709/218–219, 709/206, 225, 238; 705/76, 26–27; 379/93.24, 379/93.25, 93.03, 88.22; 382/101–102; 715/744–746, 715/741; 358/402–403
See application file for complete search history.

(56) References Cited

U.S. PATENT DOCUMENTS 5,635,918 A * 6/1997 Tett ............................ 709/206

(Continued)

FOREIGN PATENT DOCUMENTS

GB         2365566      * 2/2002     .................... 17/60

(Continued)

OTHER PUBLICATIONS

Maryam Samiei et al. "EzMail: using information visualization techniques to help manage Email", proceedings of the eighth international conference on information visualization, 2004, 6 pages.*

(Continued)

*Primary Examiner*—Srirama Channavajjala
(74) *Attorney, Agent, or Firm*—Edwin A. Skoch

(57) ABSTRACT

A method and system for identifying alternate contact information of a specific type; particularly, by providing an inputted Email address in a query, one or more alternate Email addresses can be returned to the query, using an automated database. The system is queried using an entity's known Email address, which, in turn, is associated with other contact information for the entity, such as name and postal address, and the other contact information is then used to identify alternative Email addresses for the targeted entity either at the time of the query or in preparation of the database, and the alternative Email address(es) are then outputted to the requestor from the system. The method uses knowledge of contact points of different types for the same entity to identify alternate contact points of a single type, within a database of contact information.

8 Claims, 12 Drawing Sheets

U.S. PATENT DOCUMENTS

| | | | |
|---|---|---|---|
| 5,703,783 A | 12/1997 | Allen et al. ................. 700/213 |
| 5,944,787 A | 8/1999 | Zoken |
| 5,978,799 A * | 11/1999 | Hirsch ........................... 707/4 |
| 6,373,940 B2 | 4/2002 | Shaffer ................. 379/355.02 |
| 6,374,241 B1 | 4/2002 | Lamburt ........................ 707/6 |
| 6,389,429 B1 | 5/2002 | Kane ........................ 707/200 |
| 6,389,455 B1 | 5/2002 | Fuisz ........................ 709/206 |
| 6,405,243 B1 | 6/2002 | Nielsen ..................... 709/206 |
| 6,427,164 B1 | 7/2002 | Reilly ....................... 709/206 |
| 6,615,241 B1* | 9/2003 | Miller et al. ................ 709/206 |
| 6,654,779 B1* | 11/2003 | Tsuei ......................... 718/101 |
| 6,654,789 B1 | 11/2003 | Bliss et al. |
| 6,694,353 B2 | 2/2004 | Sommerer ................. 709/206 |
| 6,701,348 B2 | 3/2004 | Sommerer ................. 709/206 |
| 6,732,092 B2* | 5/2004 | Lucas et al. .................... 707/3 |
| 6,738,827 B1* | 5/2004 | Abir ........................... 709/245 |
| 6,779,178 B1* | 8/2004 | Lloyd et al. ................ 717/174 |
| 6,988,129 B2* | 1/2006 | Quine ........................ 709/206 |
| 7,010,303 B2* | 3/2006 | Lewis et al. ................ 455/445 |
| 7,010,572 B1* | 3/2006 | Benjamin et al. ........... 709/206 |
| 7,016,938 B1* | 3/2006 | Quine ........................ 709/206 |
| 2001/0012351 A1 | 8/2001 | Shaffer ................. 379/207.02 |
| 2002/0007421 A1* | 1/2002 | Dixon et al. ............... 709/238 |
| 2002/0032740 A1 | 3/2002 | Stern ......................... 709/206 |
| 2002/0042815 A1 | 4/2002 | Salzfass ..................... 709/206 |
| 2002/0076015 A1* | 6/2002 | Norwitz et al. .......... 379/93.09 |
| 2002/0080413 A1 | 6/2002 | Sommerer ................. 358/402 |
| 2002/0083008 A1* | 6/2002 | Smith et al. .................. 705/64 |
| 2002/0087573 A1* | 7/2002 | Reuning et al. ............ 707/102 |
| 2002/0143879 A1 | 10/2002 | Sommerer ................. 709/206 |
| 2002/0156895 A1 | 10/2002 | Brown ....................... 709/226 |
| 2002/0169748 A1 | 11/2002 | Macholda ...................... 707/1 |
| 2003/0018722 A1 | 1/2003 | Almeda ..................... 706/206 |
| 2003/0018723 A1 | 1/2003 | Almeda ..................... 706/206 |
| 2003/0069874 A1* | 4/2003 | Hertzog et al. ................ 707/1 |
| 2003/0200210 A1 | 10/2003 | Lin ............................... 707/4 |
| 2003/0216982 A1* | 11/2003 | Close et al. .................. 705/35 |
| 2004/0059786 A1 | 3/2004 | Caughey ................... 709/206 |
| 2004/0186896 A1* | 9/2004 | Daniell et al. ............. 709/207 |
| 2004/0193691 A1* | 9/2004 | Chang ....................... 709/206 |
| 2004/0230565 A1* | 11/2004 | Burke .......................... 707/3 |

FOREIGN PATENT DOCUMENTS

| | | | | |
|---|---|---|---|---|
| GB | 2401002 | * | 10/2004 | ................ 12/58 |
| WO | WO 99/57859 | * | 11/1999 | ................ 12/58 |
| WO | WO 00/10107 | * | 2/2000 | ................ 17/30 |
| WO | WO 02/31682 | * | 4/2002 | .................. 17/0 |
| WO | WO 2004/044782 | * | 5/2004 | ................ 17/30 |

OTHER PUBLICATIONS

Jayashree Ravi et al. "personalized Email management at network edges", IEEE computer society Internet computing, Mar.-Apr. 2005 pp. 54-60.*

Peter Van Garderen et al. "the world bank group archieves electronic records stratecy", final report, artefactual systems inc. Jun. 29, 2002, 10 pages.*

News bytes, "How to set up your new-and-improved E-mail address", a biweekly news bulletin for FHDA community college district administrators, May 24, 2001, 2 pages.*

Hui S et al. "requirement analysis for next generation electornic mail systems", Internatinal conference on information engineering '93, communication and networks for the year 2000, proceedings of IEEE singapore international conference on networks, vol. 2, pp. 735-739.*

Hui SC et al. "a multimedia electronic mail system on a heterogeneous environment", IEEE region 10 conference on TENCON '93 proceedings, computer, communication, control and prower engineering, vol. 1, pp. 61-64.*

ACXIOM.com web site content, "Just the Facts: InfoBase eMail Enhancement," 3 pages attached, Aug. 27, 2004.

Bliss, Austin C., FreshAddress.com web site content: "NCOA for Email," 3 pages attached, 2002.

FreshAddress.com web site content, "About Us" & "General Questions," 5 pages attached, Aug. 19, 2004.

ReturnPath.com web site content, 4 pages attached, Aug. 19, 2004.

Equifax Marketing Services web site content, "Equifax Email Append" & "Questions to Ask Your Email Append Provider," 5 pages attached, Aug. 27, 2004.

US Postal Service web site content, "National Change of Address," 2 pages attached, Aug. 27, 2004.

* cited by examiner

Table 1:

| Record | Name | Postal Address | Email Address |
|---|---|---|---|
| 1 | Terry White | 403 W 54 St, NY, NY | Terryw667@onebox.com |
| 2 | Terry White | 160 Bleecker, NY, NY | Terry.white@earthlink.net |
| 3 | Terry White | 403 W 54 St, NY, NY | terryw@hotmail.com |
| 4 | Terrance White | 160 Bleecker, NY, NY | Terryw667@onebox.com |
| 5 | Terri White | 1329 E. 11th St, NY, NY | terryw@hotmail.com |
| 6 | Terry White | 1329 East 11 ST, NY, NY | White84@aol.com |

Fig. 3

Table 2:

| Record | Name | Postal Address | Email Address |
|---|---|---|---|
| 1 | Terry White | 403 W 54 St, NY, NY | Terryw667@onebox.com |
| 2 | Terry White | 160 Bleecker, NY, NY | Terry.white@earthlink.net |
| 3 | Terry White | 403 W 54 St, NY, NY | terryw@hotmail.com |
| 4 | Terrance White | 160 Bleecker, NY, NY | Terryw667@onebox.com |

Fig. 4

Table 3:

| ID | Input Email | Name | Postal Address |
|---|---|---|---|
| 9230 | Terryw667@onebox.com | Terry White | 403 W 54 St, NY, NY |
| 9230 | Terryw667@onebox.com | Terrance White | 160 Bleecker, NY, NY |

Fig 5

Table 4:

| ID | Input Email | Name | Postal Address | Email Address |
|---|---|---|---|---|
| 9230 | Terryw667@onebox.com | Terry White | 403 W 54 St, NY, NY | Terryw667@onebox.com |
| 9230 | Terryw667@onebox.com | Terry White | 160 Bleecker, NY, NY | Terry.white@earthlink.net |
| 9230 | Terryw667@onebox.com | Terry White | 403 W 54 St, NY, NY | terryw@hotmail.com |
| 9230 | Terryw667@onebox.com | Terrance White | 160 Bleecker, NY, NY | Terryw667@onebox.com |

Fig. 6

Table 5:

| ID | Input Email | Name | Postal address | Email Address |
|---|---|---|---|---|
| 9230 | Terryw667@onebox.com | Terry White | 160 Bleecker, NY, NY | Terry.white@earthlink.net |
| 9230 | Terryw667@onebox.com | Terry White | 403 W 54 St, NY, NY | terryw@hotmail.com |

Fig. 7

Recipient table

| Recipient_ID |
|---|
| 33 |

Email Address

| Email_ID | Email Address |
|---|---|
| 26 | Terryw667@onebox.com |
| 52 | Terry.white@earthlink.net |
| 192 | Terryw@hotmail.com |

Postal Address

| Postal_ID | Postal Address |
|---|---|
| 98 | 403 W 54 St, NY, NY |
| 257 | 160 Bleecker, NY, NY |

Recipient Email

| Recipient_Email_ID | FK_Recipient_ID | FK_Email_ID |
|---|---|---|
| 9 | 33 | 26 |
| 29 | 33 | 52 |
| 74 | 33 | 192 |

Recipient Postal

| Recipient_Postal_ID | FK_Recipient_ID | FK_Postal_ID |
|---|---|---|
| 72 | 33 | 98 |
| 144 | 33 | 257 |

Recipient Name

| Recipient_Name_ID | First Name | Last Name | FK_Recipient_ID |
|---|---|---|---|
| 213 | Terry | White | 33 |
| 214 | Terrance | White | 33 |

Fig. 8

Recipient table

| Recipient_ID |
| --- |
| 33 |
| 64 |

Email_Address

| Email_ID | Email Address |
| --- | --- |
| 26 | Terryw667@onebox.com |
| 52 | Terry.white@earthlink.net |
| 192 | Terryw@hotmail.com |
| 843 | hope@hotmail.com |

Postal_Address

| Postal_ID | Postal Address |
| --- | --- |
| 98 | 403 W 54 St, NY, NY |
| 257 | 160 Bleecker, NY, NY |

Recipient_Email

| Recipient_Email_ID | FK_Recipient_ID | FK_Email_ID |
| --- | --- | --- |
| 9 | 33 | 26 |
| 29 | 33 | 52 |
| 74 | 33 | 192 |
| 93 | 64 | 843 |

Recipient_Postal

| Recipient_Postal_ID | FK_Recipient_ID | FK_Postal_ID |
| --- | --- | --- |
| 72 | 33 | 98 |
| 144 | 33 | 257 |
| 178 | 64 | 98 |

Recipient_Name

| Recipient_Name_ID | First Name | Last Name | FK_Recipient_ID |
| --- | --- | --- | --- |
| 213 | Terry | White | 33 |
| 214 | Terrance | White | 33 |
| 526 | Hope | White | 64 |

Fig. 9

Table 6:

| Record | Name | Postal Address | Email Address |
|---|---|---|---|
| 1 | Terri White | 403 West 54 St, NY, NY | Terryw667@onebox.com |
| 2 | Terry White | 403 w 54th Street, NY, NY | Terry.white@earthlink.net |
| 3 | Terrance White | 403 W 54 St, New York, NY | terryw@hotmail.com |

Fig. 10

Table 7:

| ID | Name | Email1 | Email2 |
|---|---|---|---|
| 1 | Terry White | Terryw667@onebox.com | Terry.white@earthlink.net |
| 2 | Terry White | Terryw667@onebox.com | terryw@hotmail.com |
| 3 | Terry White | Terry.white@earthlink.net | terryw@hotmail.com |

Fig. 11

Table 8:

| ID | Name | Email1 | Email2 |
|---|---|---|---|
| 1 | Terry White | Terryw667@onebox.com | Terry.white@earthlink.net |
| 2 | Terry White | Terryw667@onebox.com | terryw@hotmail.com |
| 3 | Terry White | Terry.white@earthlink.net | Terryw667@onebox.com |
| 4 | Terry White | Terry.white@earthlink.net | terryw@hotmail.com |
| 5 | Terry White | terryw@hotmail.com | Terryw667@onebox.com |
| 6 | Terry White | terryw@hotmail.com | Terry.white@earthlink.net |

Fig. 12

Table 9:

| Record | Name | Postal Address | Email Address |
|---|---|---|---|
| 4 | Terry White | 1329 E. 11th St, NY, NY | terryw@hotmail.com |
| 5 | Terry White | 1329 East 11 ST, NY, NY | White84@aol.com |

Fig. 13

Table 10:

| ID | Name | Email1 | Email2 |
|---|---|---|---|
| 1 | Terry White | Terryw667@onebox.com | Terry.white@earthlink.net |
| 2 | Terry White | Terryw667@onebox.com | terryw@hotmail.com |
| 3 | Terry White | Terry.white@earthlink.net | terryw@hotmail.com |
| 4 | Terry White | terryw@hotmail.com | White84@aol.com |
| 5 | Terry White | White84@aol.com | Terry.white@earthlink.net |
| 6 | Terry White | White84@aol.com | Terryw667@onebox.com |

Fig. 14

Table 11:

| ID | Name | Postal Address | Email Address | Update Date |
|---|---|---|---|---|
| 1 | Terry White | 403 W 54 St, NY, NY | Terryw667@onebox.com | 02/27/2001 |
| 2 | Jon Dreyfous | 9 E. 18th St, NY, NY | jonnyd@hotmail.com | 12/28/2000 |
| 3 | Mihaela Grigore | 660 5th Ave, NY, NY | mg@aol.com | 08/09/2001 |
| 4 | Hubert Tai | 50 Mariposa, San Jose, CA | htai@aol.com | 03/15/2001 |

Table 12:

| ID | Name | Postal Address | Email Address | Update Date |
|---|---|---|---|---|
| 1 | Terry White | 160 Bleecker, NY, NY | Terry.white@earthlink.net | 11/18/2001 |
| 2 | Jon Dreyfous | 9 E. 18th St, NY, NY | jonnyd@hotmail.com | 12/28/2000 |
| 3 | Mihaela Grigore | 433 E. 6th St, NY, NY | mg@aol.com | 11/07/2001 |
| 4 | Hubert Tai | 50 Mariposa, San Jose, CA | htai@aol.com | 03/15/2001 |

Table 13:

| ID | Name | Old Postal Address | New Postal Address | Change Date |
|---|---|---|---|---|
| 1 | Terry White | 403 W 54 St, NY, NY | 160 Bleecker, NY, NY | 11/18/2001 |
| 3 | Mihaela Grigore | 660 5th Ave, NY, NY | 433 E. 6th St, NY, NY | 11/07/2001 |

Fig. 18

SYSTEM AND METHOD FOR IDENTIFYING ALTERNATE CONTACT INFORMATION IN A DATABASE RELATED TO ENTITY, QUERY BY IDENTIFYING CONTACT INFORMATION OF A DIFFERENT TYPE THAN WAS IN QUERY WHICH IS RELATED TO THE SAME ENTITY

CROSS REFERENCE TO RELATED APPLICATIONS

This application dates to the filing of U.S. provisional patent application 60/415,099, filed Oct. 2, 2002, containing the same subject matter.

BACKGROUND OF INVENTION

The present invention relates to the field of updating contact information, and more particularly to systems and methods for using databases of contact data and identifying alternate contact information for individuals, businesses, or households using relationships between contact data elements stored in the databases.

In today's highly dynamic and mobile environment for both business and personal communication, points of contact, such as postal addresses, telephone numbers, and internet electronic mail (Email) addresses, are continually changing. Points of contact, or personally identifiable information (hereinafter, "PII"), also include such items as birth date and governmentally-issued identification number (such as a drivers license number, social security number, or passport number) that don't often change, but can be used to identify a recipient. Such information is typically stored in fixed databases and address books of persons or businesses with which an individual has interactions, but these databases are usually not actively maintained and become quickly outdated. For purposes of this specification, the following definitions are used:

Recipient—a person, household, institution or business that changes their PII over time and with which communication is desired—this has the same meaning as "entity" which is used in the claims;

Personally Identifiable Information (hereinafter, "PII")—postal addresses, telephone numbers, and internet electronic mail (Email) addresses, birth date, and governmentally-issued identification number (such as a drivers license number, social security number, or passport number) used to identify a Recipient;

Sender—a person, institution or business desiring communication with the Recipient;

Data Processor—a person, institution or business that is receiving and processing data records to maintain a database of PII; and Data Provider—a person, institution or business that provides data records to the Data Processor.

Further, "postal address" is defined as that set of geographic data used by postal or delivery services for delivering mail, including street, city, state, and zip codes.

Since updating such contact information is typically dependent upon a Recipient voluntarily providing timely, periodic, and correct notification to the Sender, the PII data in the Sender's database is not typically updated, and once contact is lost, it is difficult to re-establish. An area where particular deficiency occurs is in on-going maintenance of Email addresses, which tend to change more frequently than most other contact points due to situational changes, such as job changes, temporary or permanent relocation, Internet service provider (ISP) changes, and also due to the fact that a change of Email address does not require a change of physical location.

When the Email address is the principal means of communication with the Recipient, loss of contact through Email may not be repairable since there are only limited broad-based, national, or international archival systems or databases having updated Email addresses, unlike a reasonably-updated telephone book or a conventional postal-forwarding service. Most conventional address updating services are dependent on having a current and/or a historical postal address, which can be manually linked to the identity of a Recipient via a postal-service forwarding-address database.

In a postal-forwarding service, change of address forms at a post office may be filled out by the Recipient, thereby allowing mail to be forwarded to a new mailing address. In the United States, for example, the U.S. Postal Service maintains such a database and licenses the data to companies that then use this information to maintain National Change Of Address (NCOA) services, wherein Senders submit their existing list of customers and their last known postal addresses to the NCOA service provider. The NCOA service provider then returns updated customer records that include a new postal address. NCOA services are useful to Senders because there is one central administrator that collects all postal address updates, such as the U.S. Postal Service. Telephone books are similarly comprehensive because there are only a few phone system providers, and they share directory information with each other.

Alternatively, the Sender may internally update an address by identifying an instance when the Recipient changes a PII element. Most companies that maintain contact information for people they do business with have some sort of internal PII-updating mechanism. For example, a bank may encourage the Recipient to contact a customer service representative in order to update PII, or the bank's web site may have a customer profile area where the Recipient can update PII. Disadvantageously, this method is dependent on the time and resources that a Sender allocates to develop facilities for the Recipients to update their PII, and, more importantly, this method, like the Postal Service's change of address forms, is dependent upon Recipients being cognizant that the Senders desire updated PII, the Recipient wishing to provide Senders with their updated PII, and Recipients actually expending time and effort updating their PII with Senders.

Conventional Email Change of Address (ECOA) systems mimic NCOA systems. Similar to an NCOA system, ECOA systems rely on submission of change of address notifications from Recipients. However, unlike with postal mail that is primarily controlled by a government postal service, there is no central facility that maintains Email addresses. Each company, institution, or individual that manages an Email domain, or computers with Email addresses, determines the Email addresses that are permissible on that system, and there are millions of domains on the Internet. In using such systems, client companies typically provide the ECOA service provider (i.e., the Data Processor) with a customer Email list, and the Data Processor provides new Email addresses for as many people as possible. The data used by these services is typically derived from three sources: 1) Recipients explicitly registering change of Email address information with the service; 2) Recipients explicitly registering alternate Email address(es) they may be reached at if the primary Email address is no longer valid; and/or 3) specialty software programming modules capturing change of address information at partner (i.e., Data Providers or other Senders) web sites as the information is updated, and then sharing that information with the ECOA provider.

In this last case, specialty software programming modules are installed at the Data Provider location where a Recipient might update contact information. The mechanism will detect if an Email address is changed and either store such information for later use or forward it to the ECOA service provider. Disadvantageously, in order to automate the collection process, such specialty software programming modules, which need to be interfaced with or merged into the existing operational programming modules of the Data Provider, may have incompatible interfaces or may interfere with the normal business operation of the Data Provider's software modules. Thus, many companies are reluctant to install such systems, because the changes may adversely impact the operation of their other business software and their limited human resources may be insufficient to install and debug such modules.

Further, because ECOA service providers are not central authorities like the U.S. Postal Service with monopoly market presence, they must advertise themselves or otherwise make Recipients, Senders or Data Providers aware that the service exists, and these arrangements can be prohibitively expensive.

A third type of address change service method exists. By maintaining large databases of postal addresses and email addresses, Email "Append" service providers have the ability to provide one type of PII when presented with PII of a different type. For example, starting with a database containing the Email addresses and postal addresses of Recipients associated together, entering an Email address can yield a postal address and vice versa. Disadvantageously, if a Sender uses only one type of PII for contacting a Recipient, for example, solely an Email address, the service of an Email Append provider is of no use because these append service providers provide a different type of PII than the one presented to them.

The preceding methods are limited due to 1) the need for the Recipient to manually update and/or otherwise register their PII with the ECOA service provider, 2) the need to install specialized software programming modules to capture PII at multiple Data Providers, or 3) the need for the Sender to have a different type of PII, for example, a postal address, to get the PII desired.

Since no system currently exists that will generate alternate Email address outputs in response to an Email input query without the preceding limitations, there exists a demonstrated need for a system wherein an Email address database can be automatically maintained using non-intrusive data extraction means, wherein generation of alternate PII data for said database does not rely on the action of Recipients, and wherein queries with one type of PII can generate updated PII of the same type, such as an Email address query to the system can generate alternate Email address outputs.

SUMMARY OF INVENTION

According to the present invention, a system for identifying alternative contact information preferably has the following components: a database which contains data records for a plurality of Recipients that include personally identifiable information (PII) for each Recipient for searching, cross-identification and decision-making; a receiver for inputting data into that database using an non-intrusive data-collecting means; an updating mechanism for merging identified updated contact data into the database; and a mechanism for receiving, processing, and responding to queries for alternate PII in the database.

Preferably, queries accepted would have at least one electronic mail (Email) address for each of one or more Recipients, and the contact information provided by the system and method for each of those Recipients in response to queries would include alternate Email addresses related to those Recipients in the queries. That is, both a query Email address and the returned Email address will correspond to the same Recipient for each query.

The mechanism for receiving, processing, and responding to queries for alternate PII is the essential part of the present invention and preferably comprises: a means for searching through the database and identifying instances within the database of the PII provided in the query, a means for identifying related PII which is of a different type than the PII provided in the query, a means for searching through the database using this different but related PII, and a means for identifying related PII which is of the same type as that provided in the query, and a means for returning this related, alternate PII which is of the same type as that provided in the query.

According to the preferred method, the preferred invention uses the query's PII, searches the database for matches, then uses PII related to those matches to find yet more PII, all related to the Recipient in the query. The final, returned PII is of the same type of the PII in the query. Another way of describing this is to say that the present invention comprises an "append" and "reverse-append" method to identify alternate contact information for the Recipient in each query.

The principal aspect of the present invention involves finding alternate contact points (hereinafter, "PII") of a given type, such as a new Email address, when provided PII of that same type, such as an old Email address. To implement this feature, three basic components, which are embodied in the mechanism mentioned above, are necessary, once the database is functional and populated with data: means for receiving query data, for performing queries, and for selecting the data element or elements to be returned to the querying party. The data receipt feature preferably comprises an automatic-system software module for receiving and processing received query data. The querying feature preferably comprises a comparison means for searching the existing database for either Email addresses or alternative PII in the database that may be related to or linked to those Email addresses. The selection feature preferably comprises a means for verifying if the compared information is correctly associated with the Recipient being sought.

The selection feature may further include an approval/authorization feature, wherein the system has a means to obtain Recipient permission before release of the Recipient's PII to the querying party (i.e., Sender). This feature is part of an optional, addition to the method of obtaining permission from Recipients before releasing their PII to a Sender; i.e., requesting and obtaining permission from a Recipient prior to returning the Recipient's PII.

The querying method in this invention is called an append-reverse-append procedure. As stated, the query has at least one type of PII for a Recipient (e.g., an Email address). Using the system or method here, a different type of PII is located in the database, which is related to the same Recipient as the query. This second type of PII is found and tagged to, or appended to, a query response during searching, and then this new, related PII is used to search for more related PII.

For example, if the query Email address is found in the database during a search, alternative PII (related to that Email address) in the database is appended to the query, if found in the database. Once the alternative PII is found and "appended," the process is reversed to find alternate PII of the original type: the database is searched, using this found and appended PII, to find additional PII of the first type in the query. That is, the appended PII (such as a postal address) is used to identify related Email addresses (i.e., the first type of PII) in the database, and that Email address or addresses found in the further searching is returned in response to the query, as an alternative to the original query.

The invention does not require a reverse-append step, but it is preferred. By changing the structure of the database, the invention can use an append-only procedure. That is, with structural changes to the database, the system can return the same type of PII as the query because all PII related to a single Recipient can be in a single table, or otherwise grouped, or linked. As the database is populated and/or maintained, similar or exact matches of PII can be related to one another such that the database can use simpler searches to lookup alternate PII. For example, if all Email addresses corresponding to a name are placed in a single table, once one of the Email addresses matches a query, all related Email addresses can be returned in response. Similarly, related data can be linked to each other in the database to provide quicker searching.

Alternately, depending on the structure of the database, and depending on data storage and data processing capabilities, searching and identifying alternative PII may be accomplished through the use of alphanumeric identifiers for the PII data in the database. The querying feature would then find alphanumeric IDs for PII that matched PII in the query. These IDs could then be used to find other PII that ultimately relates to the Recipient in the query. Alphanumeric IDs could be used to conduct the append-reverse-append implementation or can be used for grouping or linking in an append-only procedure, by appending alphanumeric identification numbers, rather than appending all corresponding referenced data.

Obviously, before a query can be performed, the database must be constructed and populated with some PII data. A method for populating and maintaining the contact information database according to the present invention preferably comprises the steps of: a) establishing a database consisting of a plurality of PII structures (said PII structure also known as a "record"), each record containing data for a Recipient, and each record comprised of data elements, (said plurality of PII structures hereinafter called a "dataset"); b) receiving one or more datasets from one or more data providers which will be used to update the database; c) identifying selected data elements to be merged into the database from the received dataset(s); d) merging the selected data elements into the database by making them data elements of PII records where appropriate, whether by making them part of existing records or including them as new records.

A PII record in the database and in updates to the database preferably includes at least three from the data element group comprising: an Email address, a name, a postal address, a telephone number, and governmentally-issued identification number (such as a drivers license number, social security number, or passport number). However, a PII record can contain as few as two data elements, such as two Email addresses. A PII query, on the other hand, preferably includes at least three from the above list, but can have only an Email address.

While the explanation of this invention references the use of Email addresses as the principle input and output from the system and method, the invention may be used, without limitation, on any type of PII listed above.

These and other features and aspects of the present invention will be readily apparent to those of ordinary skill in the art upon review of the detailed description that follows.

BRIEF DESCRIPTION OF DRAWINGS

FIG. 3 shows an exemplary Table 1 containing sample data.

FIG. 4 shows an exemplary Table 2 containing sample data.

FIG. 5 shows Table 3, an intermediate-result table from use of the append method on the data in Table 2.

FIG. 6 shows Table 4, a resultant table from use of the append/reverse-append method on the data in Table 3.

FIG. 7 shows Table 5, showing the final resulting data from Table 4 after the data is culled.

FIG. 8 shows a first preferred template for constructing tables in the database.

FIG. 9 shows a second, alternate template for constructing tables in the database.

FIG. 10 illustrates an exemplary Table 6 having multiple records for a same Recipient in the same database.

FIG. 11 illustrates a Table 7 showing the associations between the Email addresses, resulting from action upon Table 6 data.

FIG. 12 illustrates a Table 8 showing the associations between the Email addresses, resulting from action upon Table 6 data, all associated data elements being keyed by a single common column.

FIG. 13 shows an exemplary Table 9 with additional records in the same database, represented by Table 6 data.

FIG. 14 shows a Table 10 that includes all the linked records of Table 6 and Table 9.

FIG. 18 illustrates three exemplary tables having received data records.

DETAILED DESCRIPTION

The preferred embodiment of the present invention may be used by businesses or persons (i.e., Senders) to find current, alternative PII for their customers, prospects, and contacts (i.e., Recipients).

For the purposes of explanation and to illustrate the preferred embodiment of the present invention, the principle application to be described for this invention, without limitation, is to find alternate Email address(es) for an entity based an existing, known Email address. Specifically, according to a preferred embodiment of the present invention, an automated electronic mail (Email) address database system is implemented which preferably provides a more current, and hence more useful, Email address for a Recipient to a requester (i.e., Sender) who inputs an older Email address as a query.

Such a system could be used by both businesses and individuals to regain contact with customers or people they lost contact with. For example, an online company such as Amazon.com primarily uses Email to send marketing messages, such as its "Hot Deals in Electronics" Email newsletter, to its customers. As subscribers to Amazon's newsletter change their Email addresses, copies of the newsletter sent to their old addresses will be unread and undeliverable, which means Amazon loses potential sales from those customers it lost touch with. By using a service that embodies the present disclosure, Amazon.com could submit its list of customer Email addresses that no longer work and quickly receive back current, working Email addresses for these customers. By doing so, Amazon regains contact with these customers, which allows it to provide better customer service and restore some of the potential revenue it lost. Using such a service would also be much faster, more effective, and most likely less costly than the alternatives of trying to obtain the new Email addresses of these customers by contacting them via direct mail or telephone.

Similarly, an individual could take advantage of a service that embodies the present disclosure to regain contact with a lost friend. For example, John had a crush on Mary in college, but he never did anything about it. After a few years go by, he tries to get in touch with her by sending an Email to the old Email address he has for her, marysmith@aol.com, but it bounces and he gets a message back saying it is an invalid address now. A website that embodied the disclosure described herein could allow John to search on "marysmith@aol.com" and, if sufficient data is in the database, provide him with her current Email address, "maryjsmith@cox.net." John is now able to reach Mary and ask her out on a date.

Notwithstanding these examples, while the explanation of this invention references the use of Email addresses as the principle input ("query") and output ("return") from the system, the invention may be used, without limitation, on any type of PII listed in the prior sections.

Figure 1:
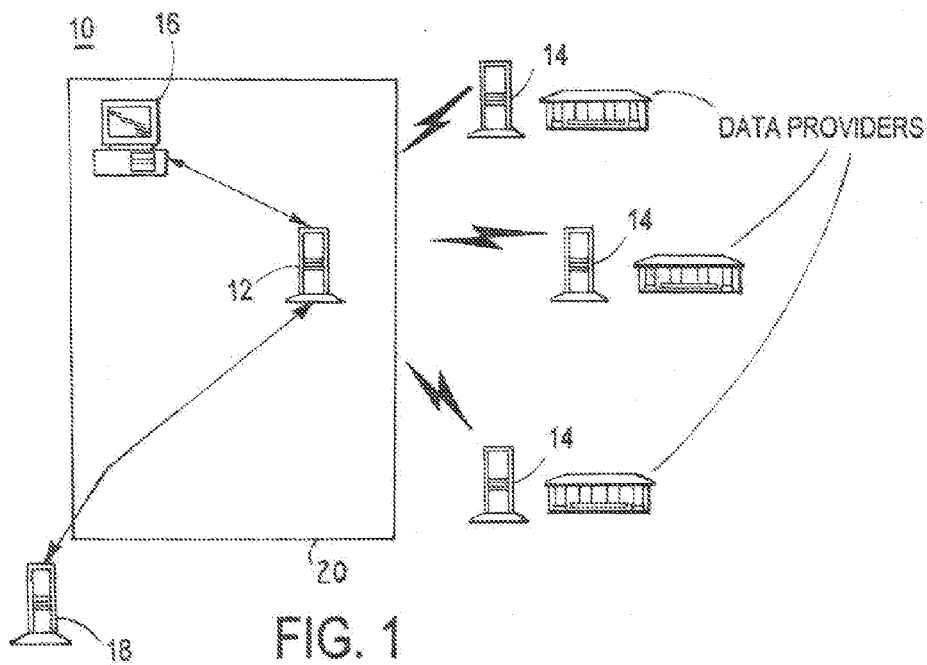
FIG. 1 illustrates a contact information system according to a preferred embodiment of the present invention.

FIG. 1 illustrates, in approximated physical form, contact information Database System, 10, according to a preferred embodiment of the present invention. The claimed system and method does not require any particular physical form, but viewing it in this fashion may be helpful for explanation.

The Database System preferably includes a Central Data Receiving and Storage Device, 12, containing a database, communications links to a plurality of remote Data Providers, 14, a Control Computer, 16, and an Querying Device, 18. The Central Data Receiving And Storage Device is preferably a server that stores the database, which has data records containing personally identifiable information (PII) for a plurality of Recipients.

Remote Data Providers, 14, maintain databases that reflect information related to their function or business and may have a data subset that includes PII, such as customer and supplier lists. The Control Computer, 16, contains processing software for processing received data and controlling the database. One or more Senders can access the system through a Querying Device, 18, which transmits queries from Senders to the database.

The Querying Device, 18, Control Computer, 16, and Central Data Receiving and Storage Device, 12, or any sub-combination thereof, may be combined into the same physical device, but are shown as separate here for purposes of explanation of the present invention, since they each have distinct functionality.

Further, the system communication interconnections may be varied to have the Control Computer, 16, Querying Device, 18, or Central Data Receiving and Storage Device, 12, inked directly with the remote Data Providers, 14. Communication interconnections can vary depending on individual constraints: these parts may be physically linked, or linked through telephone lines, the Internet, or any available data communication means.

Figure 2:
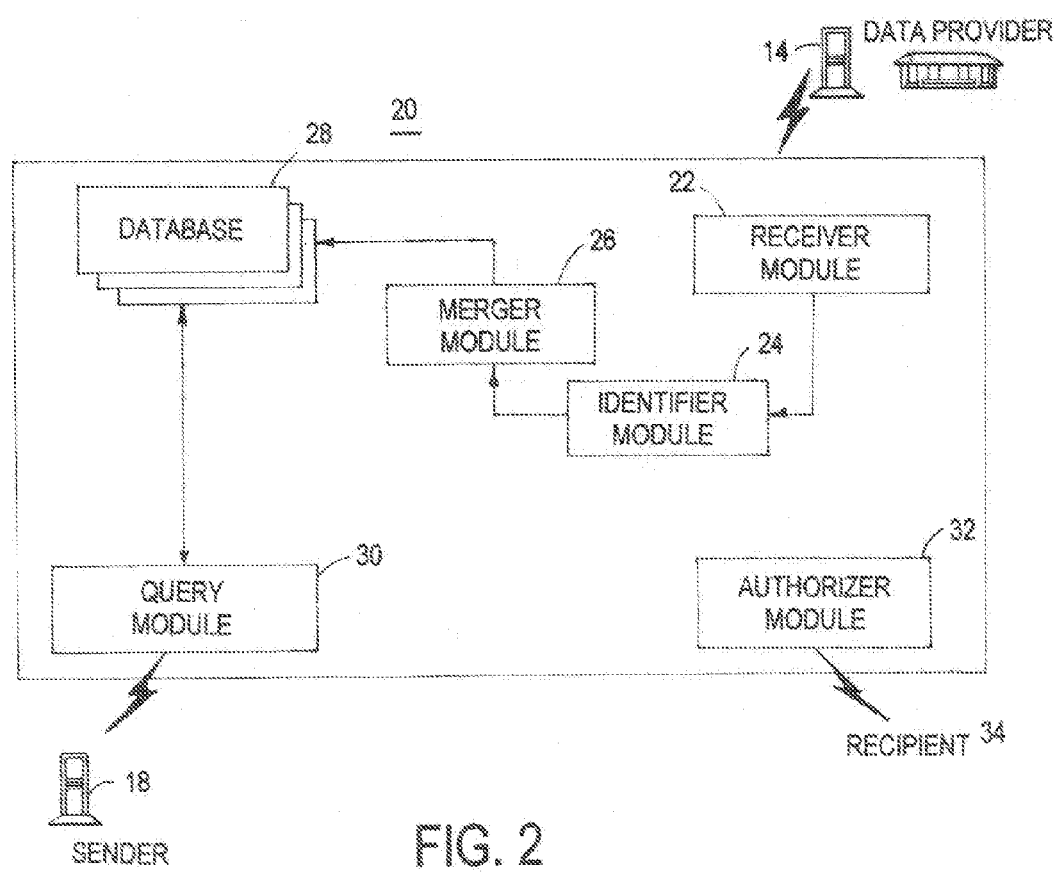
FIG. 2 illustrates a block diagram of the functional architecture of a Data Manager according to the preferred embodiment shown in FIG. 1.

FIG. 2 illustrates a block diagram of the functional, as opposed to physical, architecture of the combination of Central Data Receiving and Storage Device, 12, and Control Computer, 16, and Query Device, 18, shown in FIG. 1, and will hereinafter be referred to collectively as the Data Manager, 20.

Preferably, in order to populate and update the data used in the system, the Data Manager, 20, further functionally comprises a Receiver Module, 22, for receiving inputted data updates from one or more Data Providers, a data Identifier Module, 24, for identifying the data elements to be merged, a data Merger Module, 26, for merging the identified data into a Database, 28, and a Query Module, 30, for accessing the information in the Database. Once again, no particular functional arrangement is essential for the operation of the invention, but viewing it in this fashion can assist understanding of a potential functional arrangement.

Additionally, an Authorizer Module, 32, may be included for obtaining authorization from a Recipient before releasing PII to a particular querying entity (i.e., Sender). The Authorizer Module is optional but preferred.

The reporting and querying mechanism from Data Providers, 14, and Sender, 18, to the Data Manager, 20, is preferably non-interventional. More specifically, each Data Provider, using its own internal program, exports a dataset containing PII to the Data Manager. The selection of the particular data elements and particular data format to be transmitted may be derived from a mutually beneficial arrangement between Data Providers and the Database System provider. Different Data Providers using the Database System may provide the datasets having different format and substance. Furthermore, the Data Manager itself can also act as a Data Provider by obtaining datasets for use in the Database System, through the purchase of data, for example. The format of datasets sent by Data Providers can be compatible with business data that is normally included within their own databases, rather than requiring compatibility with or matching interfacing requirements of Data Manager or the Database itself.

In the preferred embodiment, no software needs to be interfaced with the Data Provider business systems software, thereby eliminating any reluctance to interface with the Data Manager for technical reasons. Any data translations needed may be performed by the Data Manager (by the Receiver Module), rather than the Data Providers or Senders.

The data may be transmitted to the Data Manager electronically via telephone or the Internet, or it may be transformed into a physically-deliverable data storage means, such as magnetic disks, compact discs, portable flash modules. Preferably, however, electronic transmission is desirable, since it lends itself to complete automation, with minimal human interaction and processing, thereby reducing possible errors.

Regardless of the delivery means by either Data Provider or Sender, the Receiver Module, 22, has a complementary means for receiving and converting the data back to electronic form for further processing and use in the Database.

Further, the Receiver Module performs any necessary preprocessing or conversion of the data so that the format is compatible with that of the Database. For example, the data might be processed so that it is tab or comma delineated, in ASCII text, converted between one file format and another, or even edited to eliminate unnecessary, invalid, or incomplete data.

All of these data transmission methods, interfacing methods, and formatting methods are well known in the art and can be varied to meet requirements.

After the dataset is received at Data Manager and any preliminary processing by the Receiver Module is performed to prepare the received data, one of a multitude of comparative methods may be employed to process incoming datasets and merge them into the Database. These comparison methods, such as string comparisons or word matching fuzzy logic, are well known in the art, and are performed by an Identifier Module.

For example, in its simplest form, each data record of the received dataset can be inserted into Database, whether that data record exists in the Database or not. More preferably, each data record of the received dataset can be compared with the data contained in the Database. For greater efficiency, a previously transmitted dataset saved in the Database may be compared with the present received dataset to identify a subset consisting only of changed elements or structures between the two datasets. This may be done through the use of chronological data on record information, so that the system can compare older data to newer data. This can significantly reduce processing time within the Database. Minimization of update time to allow more processing time for user queries is highly desirable, especially during periods of heavy query demand. Such comparison is preferably performed in the Data Manager to maintain a transparent and non-interventional interface between Data Manager and each Data Provider, but may be performed at the Data Provider, in order to reduce the communications channel requirements for the transfer of the data.

Referring specifically to FIG. 2, after comparisons between the received dataset(s) and the Database are performed by an Identifier Module, 24, if data is identified for inclusion into the Database, the Merger Module merges that data into Database.

Updating the Database is an independent process that does not interfere with the System's handling of Sender queries. When a Sender inputs a request or query for a particular Email address by entering an old Email address, Query Module accesses the information in Database, preferably using the old Email address as a key for searching the Database. Any records that are found (preferably with different Email addresses than in the query) are returned to Query Module for outputting to the Sender, typically in the form of a character string to be displayed as a printed response, as an update to the Sender's database, or as an electronic output file. These various output methods are well known in the prior art and are adaptable to requirements of the implementation.

The following describes preferred methods for using the embodiments of the contact information system. As mentioned, these methods provide several advantages over conventional Email address systems. For example, using a single batched query, alternate Email addresses may be found automatically for a large number of people, which represents a significant cost and manpower savings over the conventional processes of either calling Recipients to get their Email addresses or sending direct mail requesting customer responses with its attendant poor response rate. Further, Recipients are not required to explicitly register Email addresses for the purpose of providing alternate data elements. These benefits were described in the prior sections.

The system can be successfully employed even if the only item of PII that a Sender has is an Email address, as opposed to conventional Email address appending methods, which require, at a minimum, names and postal addresses of the Recipients. Finally, since Email addresses are more likely to be unique to an individual than postal addresses or phone numbers, using Email addresses as the keying mechanism is likely to be more accurate than a postal address, for example.

In the following discussion, the methods for accessing the data in Database to find alternate PII will be discussed first since query processing is the most significant aspect of the invention, followed by a discussion of methods to create and maintain the database used by the system.

As is known in the art, different database formats create different advantages and disadvantages in populating and retrieving data from a database, such as the database used here (e.g., the fewer database tables and links that are accessed, the faster a search produces an output result). In the current art, a relational database system would be the preferred embodiment, but other types of databases such as flat, hierarchical, or object databases would also serve the purposes of the current system.

For the current invention, the simplest database table construction or method of storing data would use a single table with one record (i.e., structure) for each distinct set of PII; that is, a distinct record in the table is used when at least one piece of PII is different. While maintaining distinct records in the table would reduce storage space requirements, the same results can be obtained if multiple copies of records and PII are in the table. As mentioned, each record would contain at least two of elements of PII, such as an Email address with a related postal address, an Email address with a related name, an Email address with a related Email address. Preferably, each record would include more than two elements of PII, or enough elements of PII to suitably identify a Recipient using more than one means.

A more complex implementation would use different tables representing each data element with additional tables showing the relationships between the data elements, using keys or IDs for the relationships themselves. For a simple example, a database could contain a table of unique Email addresses and a table of unique postal addresses and use a third table to show the relationships between the two types of data elements. In the following discussion, methods are presented to determine alternate Email addresses for a Recipient regardless of the database table construction used.

In the preferred method for responding to a query having one type of PII for a Recipient (e.g., an Email address), a different type of PII is generated for, or appended to, a query response. Then the process is reversed to find alternate PII of the original type. That is, the database is searched to identify whether the PII in the query is present. Any additional PII in the database, which is related to the PII in the query, is identified.

For example, when the initial query contains an Email address, the process preferably appends other types of PII (such as a name and postal address related to the query's Email address), which is of a different type from the initial query PII type, to the query response.

That second type of PII found in the initial Database search is then used to search for and append related first-type PII (i.e., other Email addresses) to the initial query response. In this fashion, two "appends" are taking place: an append plus a reverse-append.

This reverse-append is accomplished by searching through the Database using the second type of PII and identifying, for example, all Email addresses (the first type of PII, from the query) which are related to the second type of PII. That is, using, say, a name and postal address found in the initial append step, the Database is searched to find all Email addresses related to that postal address.

This offers a significant advantage over conventional processes, which use only a single append step. That is, conventional processes append in one direction only, such as, Email-address-to-postal-address and then return the found postal address. The conventional postal address change of address (NCOA) systems mentioned previously are the only systems capable of returning the same type of PII that is present in the query, and they only deal with an inputted postal address and a returned postal address; those systems do not use an append then reverse append process.

As an example, using the preferred embodiment, an initial query will contain an Email address. Names and/or postal addresses that match that queried Email address will be appended to the query. The database will then be searched using those matching names and/or postal addresses to find more Email addresses. These new Email addresses will then be returned to the querying Sender.

The following example illustrates the simplest implementation of this method and system step-by-step. The implementation can be used for multiple inputted PII at once, but, for simplicity, only a single piece of PII is inputted in the example query: an Email Address of "terryw667@onebox.com". A single table represents a sample Database, as shown in FIG. 3.

FIG. 3 shows an exemplary Table 1, which has the simplest form of database table construction and will be used to demonstrate an append and reverse-append method for generating a query response.

In this example, the Sender inputs the Email address "terryw667@onebox.com" as a query and desires one or more alternate Email addresses for this Recipient. The input Email address is compared to the records in the Table, identifying Records "1" (labeled numerically here for convenience only) and "4" of Table 1 in FIG. 3. As is shown in the tables, the queried Email address is found in two different records in the table. These records match the queried Email address, and they have associated PII of a different type: here, names and postal addresses.

The queried Email address, in this example, is associated with the name "Terry White" and the postal address "403 W 54 St, NY, N.Y." found in "Record 1" of the Table. Secondly, in "Record 4" of the Table, the queried Email address is also associated with the name "Terrance White" and the postal address "160 Bleecker, NY, N.Y.".

Whereas a conventional "append" process would stop at this point and return the located addresses and names, the invented method and system immediately reverses the procedure, adding further search and identify steps and returning additional results whenever successful. In the present invention, the names and postal addresses generated by the first append step may be used as keys to find other records for this Recipient in the Database. Even more useful, the invented method can return alternative Email Addresses for this Recipient.

Specifically, using the newly found names and postal addresses associated with the queried Email address, the same Database is searched for those names and postal addresses. In this simple example, the second append, or "reverse-append," locates two more records which are responsive to the inputted Email Address: Records "2" and "3" in Table 1 of FIG. 3. Then, using these two additional records, the system retrieves the Email addresses related to these records: "terry.white@earthlink.net" and "terryw@hotmail.com".

This append/reverse-append method represents an implementation of finding alternate PII. For example, given an Email address, the invention finds any names and postal addresses associated with that Email address. Then the invention finds other records with the same names and postal addresses and returns corresponding alternate Email addresses.

The append/reverse append method, described above, may also be extended to include multiple appends/reverse-appends to find even more alternate PII. That is, after an initial append/reverse-append is completed, we can repeat the process, and use the resulting data elements to find other records in the database having the related data and repeat the append/reverse-append process until we find all alternate PII included in the database.

To continue this example, using FIG. 3, upon completion of the above append/reverse-append process, two alternate Email addresses were found (i.e., "terry.white@earthlink.net" and "terryw@hotmail.com"). Using this extended append/reverse-append method, additional steps preferably comprise: 1) using the first set of alternate Email addresses identified, finding other database records having the same Email addresses associated with different PII, e.g., names and postal addresses, than previously encountered for the Recipient; 2) using the different PII identified in step 1), searching the database for records matching the PII and containing Email addresses not previously identified for the Recipient, and 3) appending the matching Email addresses. These steps can be repeated until no more new Email addresses are found for the Recipient.

In this example with the additional steps, focusing on Table 1 of FIG. 3, the first append/reverse-append result, "terryw@hotmail.com", matches Record "5", which in turn contains a corresponding name of "Terri White" and a postal address of "1329 E. 11th St." In step 2), searching the Table again using "Terri White" at "1329 E. 11th St" finds Record "6" and a new alternate Email address: "white84@aol.com". Steps 1) and 2) can be repeated with any new Email addresses found, until no new records are found.

Note that, in this example, the append/reverse-append method described above immediately discarded from the process the original PII that was in the query, while searching for alternate PII, because the original PII is assumed to be no longer valid or the Sender wishes to identify alternate contact points for the Recipient. If the queried PII (an Email address in this example) is immediately discarded, one or more of the Email addresses resulting from the process may be the same as the Email address in the initial query. It is, therefore, preferable to keep the original PII from the query in some type of temporary storage or memory so that the final results can be compared with the original query and PII matching the original query discarded at the end of the procedure, just before a query response is made. Thus, a second append/reverse-append method according to the present invention preferably comprises the steps of: performing an append, then perform a reverse-append, repeating the process, and then discarding or suppressing all the Email addresses that were on the original query. This second append/reverse-append method is well suited for batch processing. It requires the initial query data to be temporarily retained throughout the process, and compared to the final results for culling out the initial query data elements.

For example, a large query file of input Email addresses is converted to names and/or postal addresses (i.e., an append). The entire result file is then converted back to Email addresses (i.e., the reverse-append), and then all of the Email addresses from the original file are removed before being returned to the Sender. Because the inputted Email addresses are already in the possession of the Sender, they may discarded from the output.

As an example, refer to Table 2 in FIG. 4, which represents a sample Database. The Sender desires current Email address(es) for a Recipient and provided, in a query, the Email address "terryw667@onebox.com" (presumably a no-longer-functioning Email address because the Sender is seeking a new one). The input/query Email address is assigned a unique identifier, here: "9230".

The process begins by appending the names and postal addresses associated with this Email from Table 2, FIG. 4. In this example, two associated name-and-postal-address combinations are found in the database (i.e., "Terry White", "403 West 54th Street, NY, N.Y." and "Terrance White", "160 Bleecker, NY, N.Y."). The appended records are tagged with the unique ID of the queried Email address, as shown in Table 3 in FIG. 5.

The resultant names and postal addresses are then used to perform a reverse-append to find all the Email addresses in the database for this Recipient (i.e., "terry.white@earthlink.com", "terryw@hotmail.com", and "terryw667@onebox.com", referring to Table 4 in FIG. 6). That is, the postal addresses are used to search the database for more Email addresses related to the original Recipient.

For the set of records pertaining to ID "9230", any records that have a corresponding output address of "terryw667@onebox.com" are then discarded, and result shown in Table 5 in FIG. 7. Alternatively, any records where the input/query Email address and the output Email address are the same can be removed. The discarded records are not considered useful, since the have the same Email address as the query, and it is assumed that the PII in the query is old.

An alternative template for the Database may be constructed as shown in the tables in FIG. 8. This can use the same append-reverse-append method as discussed. Note that the tables show only the information for a single Recipient, designated in the example as "33" (i.e., the "Recipient_ID" is "33" in the example). To store the PII, the Database would preferably contain the following data tables:

Recipient Table—Has one "Recipient_ID" per uniquely identified Recipient.

Email_Address Table—List of known Email addresses, each with a corresponding unique ID ("Email_ID").

Postal_Address Table—List of known postal addresses, each with a corresponding unique ID ("Postal_ID").

Recipient_Email Table—Associations of Recipients to Email addresses, using the IDs of each, and assigning a unique ID for each association (the "Recipient_Email_ID").

Recipient_Postal Table—Associations of Recipients to postal addresses, using the IDs of each, and assigning a unique ID for each association (the "Recipient_Postal_ID").

Recipient_Name Table—The names for a Recipient, preferably first and last name, showing the association between the actual names and the matching Recipient_ID, and assigning a unique ID for each association (the "Recipient_Name_ID").

The names in the example were chosen for clarity, but it is not essential for the invention to use the same names for any of the items above. Further, while it is preferred that the tables are structured as listed above, it is not essential that an embodiment exactly follow this tabular structure. Per programming constraints, one or more of the above tables may be combined or altered. These tables simply illustrate how alphanumeric identification numbers can be used to restructure the database.

Also, in tables in FIG. 8, when a data element is used in another table, the element is renamed as a "foreign key" for clarity. That is, "Email_ID" is renamed "FK_Email_ID" when used in the Recipient_Email table. This convention is known in the art and widely used.

The advantages of such a database format is that the relationships between the elements of data are fully normalized, as is known in the art, and the Database has reduced data storage requirements because each item of PII, for example, an Email address, is only stored once in the Database. That is, even if two Recipients share a postal address, that postal address is only listed in the Database once, and is shown elsewhere in the Database to be related to two Recipients, rather than having the postal address repeated in two separate records, once for each Recipient. This leads to the additional benefit of having all the PII for a Recipient grouped and linked together, which can be used in an alternative method for the current system.

The present invention includes an alternative method for identifying alternate PII for a Recipient: locate the inputted PII in the Database and return any other PII of the same type that is associated with the inputted PII, and the intended Recipient, in the Database. The preferred embodiment for this method is to group or link all the PII for a Recipient together in the Database. Then, rather than appending and reverse-appending two different forms of PII for a given Recipient, the Database may first be queried to identify the Recipient based on the inputted PII, or Email address in the preferred embodiment, and then queried to return all the Email addresses linked to that Recipient that are different than the Email address in the initial query. The Database format just described and illustrated by example in the representative tables in FIG. 8, is one way to implement a Database structure in support of this method, and any known data elements for a Recipient may be found by searching for the relationships between the data elements.

EXAMPLE 1

By inputting a queried Email address of "terryw667@onebox.com", find other known Email addresses for that Recipient. All references in this example are to the tables in FIG. 8.

1) Lookup query Email address ("terryw667@onebox.com") in the Email_Address table, which returns an Email_ID of "26" for that Email in the Database.

2) Use the identified Email_ID (i.e., "26") to lookup all Recipients that are associated with that Email address in the Recipients_Email table. This table shows all of the individual Recipients that are associated with that single Email address. In this example, using the identified Email_ID ("26") to query values in the foreign key "FK_Email_ID" in Recipients_Email table (i.e., Email_ID is used as a foreign key in this table) returns a single Recipient_ID ("33"). (The corresponding Recipient_Email_ID key for this association is "9", which designates an ID for this relationship.) dd3) Search Recipients_Email table for all records that have the found Recipient_ID ("33") and have an FK_Email_ID different than the previously identified Email_ID ("26"). This search returns two other FK_Email_IDs: "52" and "192"

(with corresponding association keys, Recipient_Email_IDs, of "29" and "74", respectively).

When more than one Recipient_ID is found, the preferred embodiment can either retrieve all the Email addresses for all the relevant Recipients and return them all as an output response, or the procedure can use the Recipient's name to distinguish which Recipient was intended (e.g., "Terry" may share an Email address with his wife, "Hope" and a Recipient search for "Terry" would eliminate those Email addresses corresponding also to "Hope"). Of course, name differentiation can only be used if an input name was provided with the input Email address in the original query.

4) The found Email_IDs can then be used to retrieve the Email addresses from the Email_Address table ("terry.white@earthlink.net" and "terryw@hotmail.com" are associated with the Email_IDs "52" and "192", respectively).

Note that this alternate method is not a strict append-reverse-append because only one type of PII was used. However, structuring the database this way can allow for an append-reverse-append method.

For another example, assume that data for Terry's wife "Hope" was in the database, the tables would then look like the tables in FIG. 9. Hope lives in the same house as Terry but has the unique Email address, "hope@hotmail.com".

EXAMPLE 2

By inputting a name and postal address of "Terry White" and "403 W 54th St, NY, N.Y.", find all the known Email addresses for that Recipient. All references in this example are to the tables in FIG. 9.

1) Lookup the input postal address in the Postal_Address table (which returns a Postal_ID of "98").

2) Use the Postal_ID ("98") to lookup all Recipients associated with that address in the Recipient_Postal table (Recipient_IDs of "33" and "64" are returned).

3) These Recipient_IDs ("33" and "64") are searched for in the Recipient_Name table (and correspond to "Terry" and "Hope", both with the last name of "White"). Compare the input name ("Terry White") to all of the names associated with these Recipients in the Recipients_Name table. In this example, there is a match to a Recipients_Name (record "213": "Terry White"); that is, the Recipient_ID obtained above match the First Name and Last Name found in the Recipient_Name table. Only the Recipients_ID ("33") which matches the input name (not "64") will be used because the other name ("Hope") found in the Recipient_Name table did not matched the original queried name ("Terry").

4) Use the Recipient_ID(s) where the name matched, to return to and query against the Recipients_Email table for all Email addresses for that Recipient (this returns three Email_IDs: "26", "52", "192" in the example).

5) Retrieve and then return the actual Email addresses from the Email_Address table ("terryw667@onebox.com", "terry.white@earthlink.net", and "terryw@hotmail.com", corresponding to Email_IDs "26", "52", "192", respectively).

Note that this second example used an append-reverse-append procedure.

The quickest way to query and return alternate PII for a Recipient is to have a database structure that directly stores Recipient PII of one type in relation to alternate PII of that same type. For example, a table that shows only the associations between Recipient Email addresses, such as the three different Email addresses for "Terry White", as shown in Table 7 of FIG. 11.

Table 7 represents, for this example, the shortest possible (i.e., requiring the least storage) table revealing all associations of Email addresses for this single Recipient. The table uses two columns of Email addresses, showing an association between the Email address in the first column with the Email address in the second column. All Email addresses down and across the table are associated, so a minimum number of associations are represented and the table is as short as possible.

When associations between Email addresses are stored as illustrated in Table 7 of FIG. 11, multiple queries against the table are required to identify other Email addresses related to an input Email address. Thus, for an inputted Email address "terry.white@earthlink.net", in this example, it would take two passes to find the other Email addresses linked to the input address, one for each column in the table. In this example, a total of two alternate Email addresses were found for the input Email address. The append-reverse-append method is not necessary with this database structure.

If processing overhead is more of a concern than data storage costs, one can overcome the processing overhead of making multiple queries by integrating the results together: data tables may be created in a format where, as illustrated in Table 8 in FIG. 12, all Email addresses are listed in a single column and their associated Email addresses are listed in the second column. That is, rather than requiring more than one passes through a shorter table, a single query down one column of the table reveals all matches for all Email addresses. This, of course, requires approximately twice the amount of data storage, but reduces processing overhead by requiring a single pass over the data. Thus, Table 8, FIG. 12 is an example of a single-pass version of Table 7, FIG. 11. Methods for populating tables such as in FIGS. 11 and 12 are described below along with the other database population methods.

At the conclusion of any of the preceding methods for selecting alternate PII, any duplicate PII retrieved in the query process is preferably discarded from the result set. That is, if multiple records in the Database yield the same result to a query, e.g., five occurrences of "terryw@hotmail.com", only one instance of that result should be returned in the results.

Regardless of the method used to find it and regardless of the table format used to construct the Database, once an alternate Email address or other data element is found it may be validated or authorized prior to delivery back to the Sender who inputted the initial query. If an Email addresses is known to be or can be shown to be out of service or undeliverable, as mentioned above, it may preferably be removed from the possible results that would be presented to the Sender (but not removed from the Database, of course). Depending on legislation, privacy regulations, and the rules governing an implementation of the invention, authorization or permission from the Recipient may be obtained prior to delivering an Email address to a requesting Sender.

In many cases, the Database may have more than one Email address or other PII for the intended Recipient, but, typically, a Sender is only interested in obtaining one working Email address for the Recipient. Therefore, when more than one alternate data element is found in the database, one of the alternates may be selected and presented to the Sender who inputted the query. Depending on the Sender's reason for contact, the Sender may prefer to reach the Recipient at a personal address or at a work address, and in all cases the Sender would desire a data element that is actually used by the Recipient and where communications to the Recipient will actually received and read. The preferred implementation would then, depending on the requirements of the Sender, retrieve either a current work address for the Recipient or a personal address that is actively used by the Recipient.

To distinguish between personal and business Email addresses, the implementation would preferably review the domain name of the email to determine if it is more likely business than personal. For example, an Email address "abc@aol.com" is more likely to be a personal Email address than "abc@ibm.com". A list of more commonly "personal" Internet service providers could be maintained and used as a comparison to cull personal or business Email addresses from the final output.

For personal Email Addresses, the preferred implementation would select, if available, an Email address at an Internet Service Provider the Recipient would have to pay to use. It is assumed that a person is more likely to use an Email Address for a service he or she pays for rather than an Email Address for a free Internet service. For example, Email addresses from free services such as Hotmail (e.g., "abc@hotmail.com") and Yahoo could be culled from results.

Having described the methods for accessing and using the data in Database, the discussion will now be directed to the creation and maintenance of the Database, followed by alternate tabular embodiments of data structures that may be employed to optimize responses to queries. Data collection at each Data Provider, 14, as shown in FIG. 2, may be accomplished via monitoring specific Recipient interactive activity at different portions of a business, in addition to the normal requests for update information. For example if a Recipient submits an on-line application or registration form to a division of the Data Provider, 14, in the normal course of business, typically the Recipient's Email address is requested in the registration information along with other PII, such as postal address. Since all of the PII elements from the application/registration are then stored, the information that links the different forms of PII together is also stored in the local database. Alternatively, a Recipient may send an Email to the business or respond via Email to a business electronic advertisement. In either case, the Email addresses are automatically captured and linked to additional PII that would be included in the overall transaction (e.g., a local database entry regarding the original transmission of the targeted advertisement, so that, for example, the success of the advertisement could be tracked) and stored in the local database. Additional information included in the PII of such applications/registrations includes, without limitation, postal address, complete name, telephone numbers, employer, business, and purchasing preferences and references, etc.

After the data is collected over a period of time, a portion of the Data Provider's local database is preferably exported to the Data Manager, 20, for processing and merging into the Database. While logically the roles of Data Provider and Data Manager are described separately, the entity that acts as Data Manager can also fulfill the role of a Data Provider and collect Recipient data for its own system. Scheduling an export to the Data Manager may be performed via an internal timer/scheduler at the Data Provider, 14, or may be initiated by a scheduling/timer module (not shown) in Data Manager. For a completely non-interventional application, the timer is preferably included in the Data Manager.

Upon receipt of the exported dataset from Data Provider, and after subsequent error correction processing that may be incorporated in the communications system, the dataset is preferably compared in an Identifier Module, 24, with a previously exported dataset from the same Data Provider, preferably using conventional data string comparison techniques, or comparisons of versions or chronological data. If no previous version of the dataset exists, the entire dataset is transferred to the Merger Module, 28. Optionally, if the previous version does exist, the data differences are identified and only the differences are transferred to the Merger Module. If the dataset consists of raw (i.e., unreduced) data, there may be several entries for the same Recipient. Further, abbreviations or spelling changes in records, such as use of a first initial instead of a first name or the absence of the first name may also produce multiple entries for the same Recipient, each having a unique variation. Reduction of these types of differences can be improved by the application of fuzzy logic to both the incoming dataset and Database.

Figure 15:
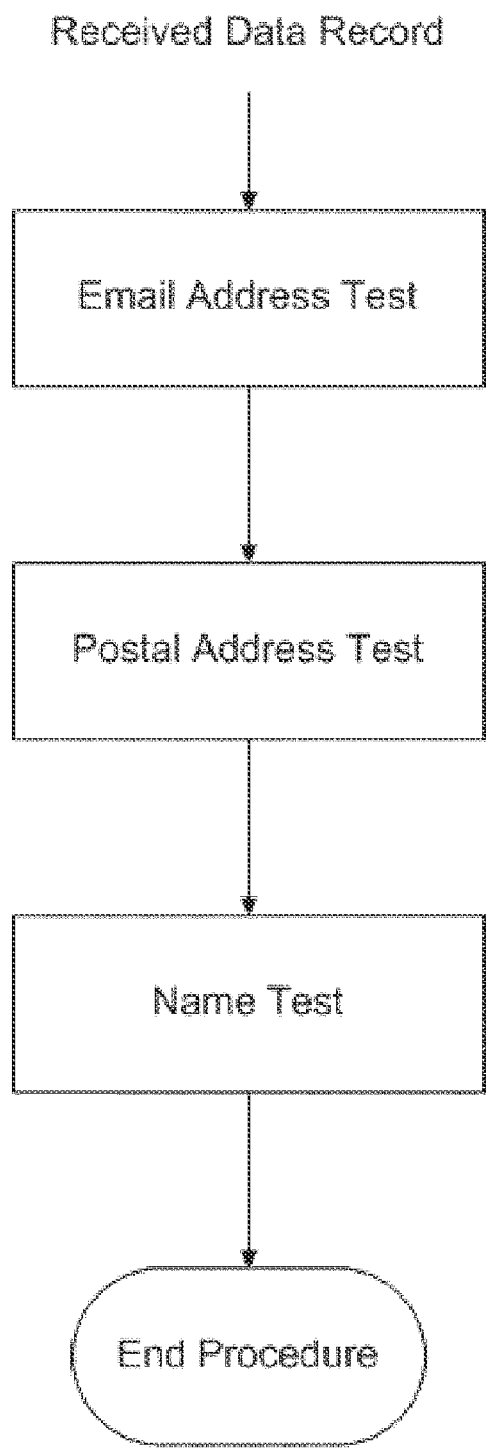
FIG. 15 illustrates a summary flow chart of the steps of a preferred method used in the Identifier Module of FIG. 2.

FIG. 15 illustrates a flow chart of the logical decision making steps of a preferred method of maintaining the Database, as used in an Identifier Module, 24, and a Merger Module, 28. Each record of the received dataset is preferably processed by sequentially performing: an Email Address Test, a Recipient Test, a Postal Address Test, and a Name Test. In the method shown in FIG. 15, the data records are analyzed individually to determine and store all the associations between various data elements contained in the records. To simplify the explanation, this discussion will describe a Database that stores names, postal addresses, and Email addresses. However, it can easily be extended for any other type of PII such as phone numbers, etc. (And, as noted above, the invented method does not require the Database to contain more than a single type of PII.)

As discussed previously, a preferred method to identify and store PII would be use to a database template with the following population:

Recipient—Has one record per uniquely identified Recipient.

Email_Address—List of known Email addresses.

Postal_Address—List of known postal addresses.

Recipient_Email—Associations of Recipient to Email addresses.

Recipient_Postal—Associations of Recipient to postal addresses.

Recipient_Name—The names for an Recipient.

The Identifier Module and Merger Module are configured to create a data record for a new Recipient, if none existed before. Further, if the Recipient exists in the Database, but the current record represents a new data element for that Recipient, the new data element will be added and linked to the existing Recipient. Alternatively, if the new data element exists in the database but is found to belong to a different Recipient, the new Recipient is created and linked to the existing data elements that are also related to that different Recipient. Finally, if the new data record being inputted shows that data entries that were previously inputted as two different Recipients are actually the same Recipient, those Recipients may be merged together.

Following are descriptions of some representative data processing steps used in an Identifier Module and Merger Module in a representative process for loading a single data record. However, not all data flows are described, but rather the list is abbreviated for purposes of explanation.

The following cases and the resulting actions can occur during the process:

Case 1: If a Recipient exists in the Database, with the same Email, postal, and name as the inputted data record, do nothing, and proceed to the next record. That is, the data is already present, so no action is taken.

Case 2: If the Email address on the data record belongs to one Recipient in the Database, but the postal address belongs to a different Recipient, yet those two Recipients have the same name and share the name on the received data, then merge those two Recipients into one. That is, the data is present, but is present in distinct records, so the Recipient's data needs to be merged together.

Case 3: If the Email address and postal address of the data record exist in the Database, but are associated with Recipients with different names than on the data record, create a new Recipient with the new name and associate the Email address and postal address with that new Recipient. That is, a new name is introduced and a new Recipient created, but has PII shared with existing Recipients and so is associated with that existing PII.

Case 4: If the Email address exists in the Database, belonging to a Recipient with a name matching the queried data record but the postal address is new, add the postal address in the Database, and link it to the existing Recipient. That is, new postal address information is introduced for an existing Recipient, and should be linked with that existing Recipient.

Case 5: If the Email address exists in the Database, belonging to a Recipient, but the postal address is new and the name on the inputted data record does not match the name of the existing Recipient, create a new Recipient and a new postal address, and link the existing Email address to that Recipient. That is, a new postal address with a new name is introduced, but is attached to an existing Email address, so a new Recipient is created and linked to the existing Email address.

Case 6: If the Email address did not exist or did not belong to a Recipient, but the postal address belonged to a Recipient with the same name, add the Email address of the data record to that Recipient that already existed in the Database. That is, a new Email address is introduced, but the associated PII already exists in the Database, so the new Email address is linked with the existing PII.

Case 7: If the Email address did not exist in the database but the postal address was associated with a different Recipient, insert the Email address and create a new Recipient. That is, a new Email address is introduced for a new Recipient, but some of the PII already exists in the Database, so a new Recipient is created, and linked with any existing PII already in the Database.

Case 8: If the Email address and postal address did not exist in database or were not associated with a Recipient, insert the new PII and create a Recipient that links them together. That is, a new Email and postal address were introduced for a new Recipient.

Case 9: If the Email address and postal address already existed in the database, the postal address was associated with the same Recipient as the input record, but the Email address was associated with a different Recipient, then link the Email address to the Recipient corresponding to the postal address. That is, the PII already existed, but only the postal address had a Recipient matching the input record, and the Email address is linked to that matching Recipient.

Case 10: If the Email address and postal address already existed in the database, the Email was associated with the same Recipient as the input record, but the postal address was associated with a different Recipient, then link the postal address to the Recipient corresponding to the Email address. That is, the PII already existed, but only the Email address had a Recipient matching the input record, and the postal address is linked to that matching Recipient.

The operations and routings that occur at each test in FIG. 15 will now be described, with greater specificity, in relation to FIGS. 15A-15B. Each separate data record in the dataset received from the Data Provider follows the flow chart separately, but, in this example, all steps are illustrated for a single date record. The arrows directed rightward (and labeled "Next input record") in the FIGS. 15 represent an exit of the immediate procedure and a return to obtain a next inputted data record for repeating the flow-chart process shown in FIG. 15.

All steps presented are done so logically. One or more steps can be combined or performed simultaneously. The steps are broken out here to illustrate all logical steps involved. Further, these steps presume that the PII used includes the preferred name, postal address, and Email address, as noted above. If fewer PII types are used, some logical steps are eliminated.

Figure 15A:
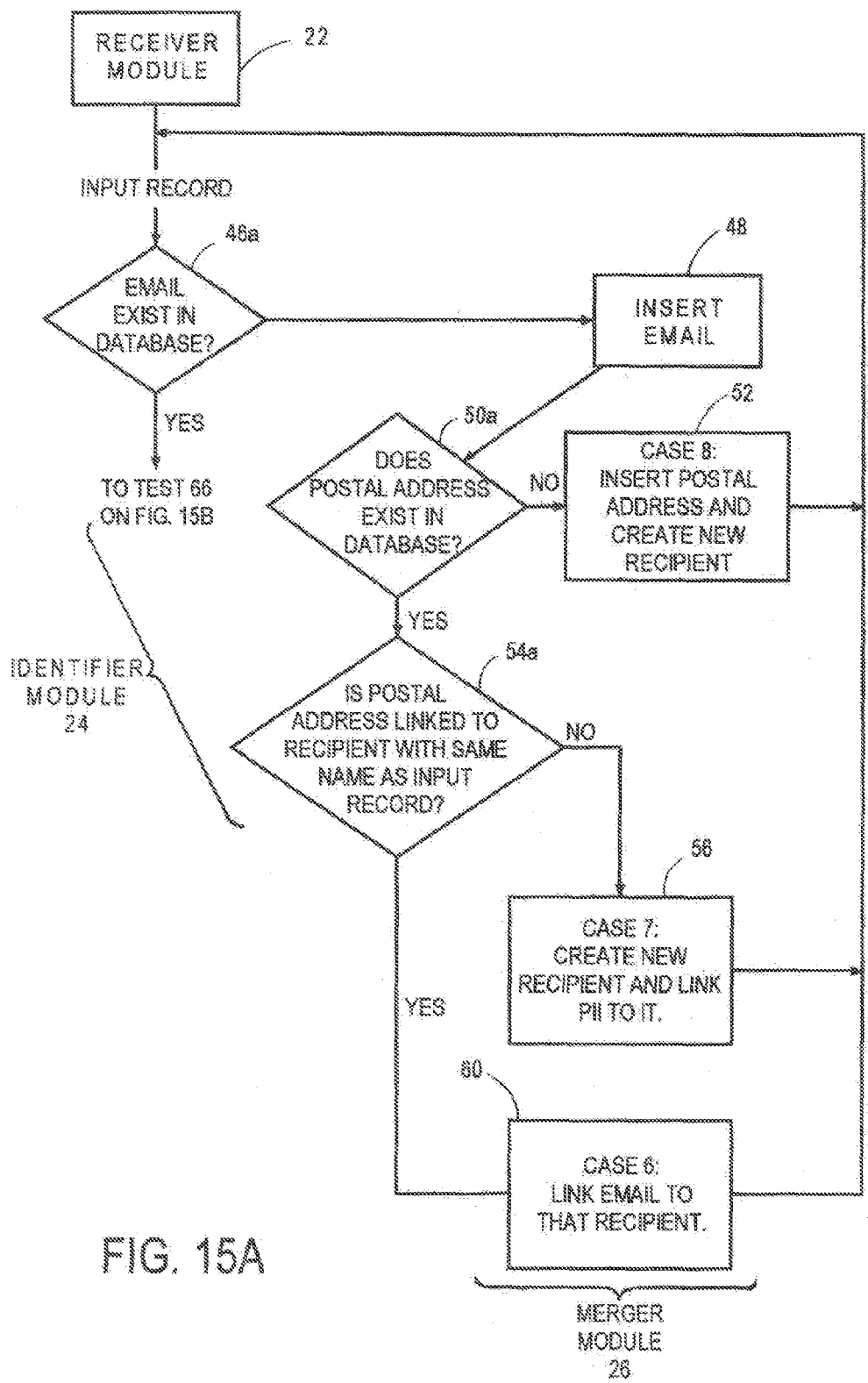
FIG. 15A illustrates the first set of detailed steps of FIG. 15.

FIG. 15A illustrates the steps included in the Email Address Test and what occurs if the Email address does not exist in the Database. The Database is searched for the Email address in the received data record (step 46). If the address does not exist, then the Email element of the received data record is inserted into the Database (step 48). Then a Postal Address Test is conducted by searching the Database for the postal address element of the queried data record (step 50). If both the Email address and the postal address are not found, it may be assumed that the queried data record is not in the Database and, accordingly, the data record is added as a new Recipient into the Database, with appropriate linkages (step 52, which reflects Case 8, above), and the procedure is exited, and the next received data record is processed.

If, however, the postal address does exist in the Database, a Name Test comparison is made to determine if the existing postal address is associated with the same Recipient name from the received data record (step 54). That is, the procedure checks the name linked to existing postal address to see if it matches the name in the received data record with same postal address. If not (i.e., the postal address exists in the Database, but is linked with a distinct name from the received data record's Recipient), the Recipient is added into the Database (step 56), and the procedure is exited. Step 56 reflects Case 7, above. Obviously, there can be more than one Recipient with a single postal address.

If the name is equivalent, the new Email from the received data record is linked to the existing Recipient's record (step 60, which represents Case 6, above), and the procedure is exited.

Figure 15B:
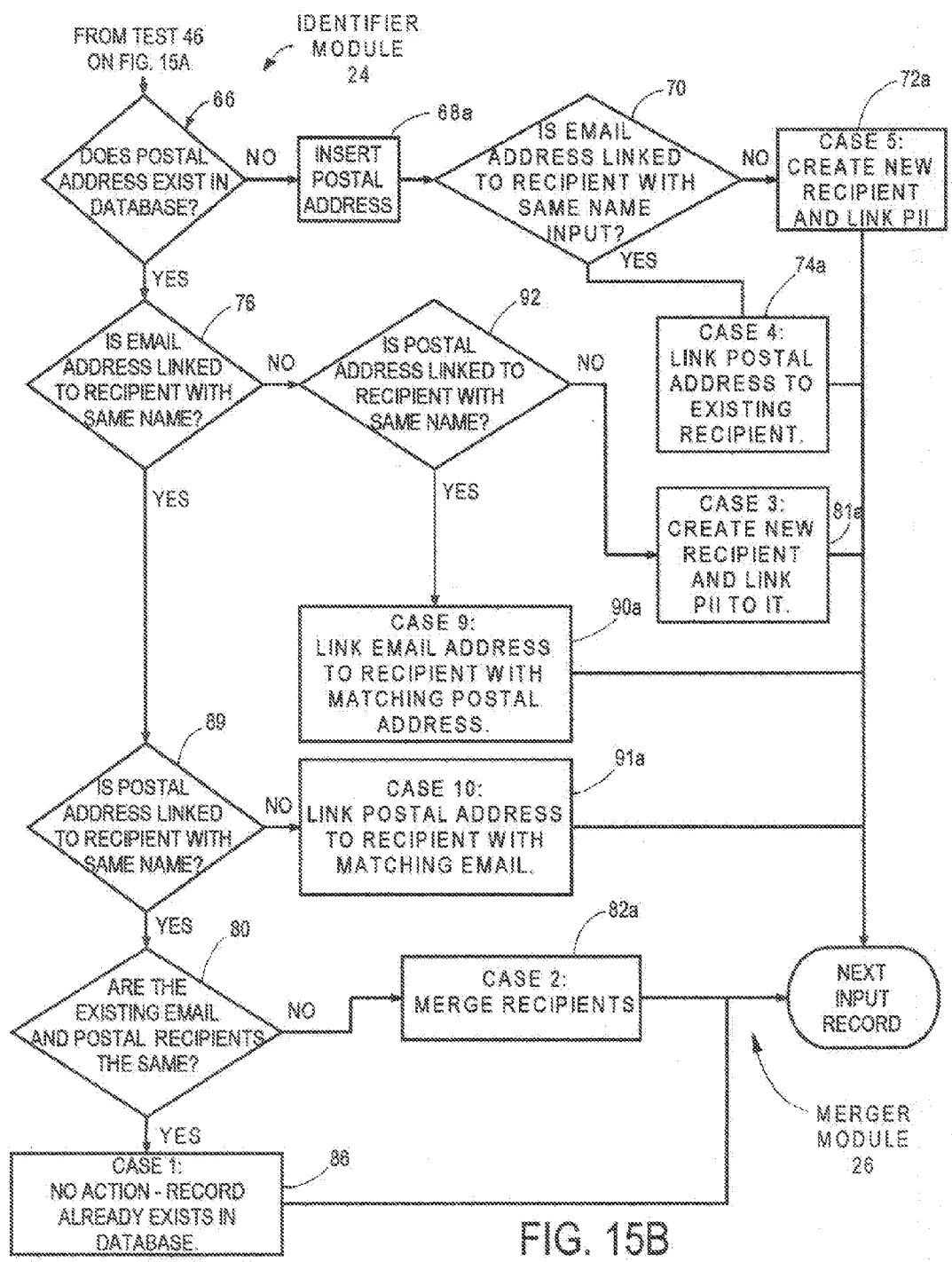
FIG. 15B illustrates the remaining detailed steps of FIG. 15.

If the received data record Email address exists in the Database (as determined by the test in step 46), the process proceeds to the logical steps in FIG. 15B.

Upon entry to the Postal Address Test at step 66 in FIG. 15B, the Email address has been determined to exist in the Database. Now the Database is queried to check if the postal address from the received data record also exists in the Database (test 66). If the postal address does not exist in the Database, it is marked for addition to the Database (step 68). A Name Test is then used to determine whether the Email address previously located in the Database (step 46 in FIG. 15A) is associated to a Recipient with the same name as the person in received data record (step 70). If the received data record name does not match to a Recipient associated with the Email address in the Database, a new Recipient is created in the Database, which includes all the PII included in the received data record (step 72, which represents Case 5, above). That is, the procedure has found an input record representing a new Recipient who shares an Email address with an existing Recipient. The procedure is then exited.

If the Email address exists in the Database attached to a Recipient with the same name as on the input record, but the received data record postal address did not exist in the database and was added, the newly inserted postal address for the received data record is linked with the existing Recipient in the Database (step 74, which represents Case 4, above). That is, the process has found a new postal address for an existing Recipient. The procedure is exited.

If the postal address did exist in the Database (step 66), a Name Test is performed to determine if the Email address that is also in the database is associated with a Recipient of the same name as the received data record (step 76). That is, the received data record name is compared with the name of the Recipient with the matching Email address. If names do not match, a Name Test is then done to compare the name on the received data record with any Recipients linked to the postal address (step 92). If names do not match for the postal address either, a new Recipient is created in the Database and the Recipient is linked with the existing, corresponding postal address and Email in the Database (step 81, which represents Case 3, above). That is, the received data record Email and the postal address exist in the Database, but the received data record name represents a new Recipient that shares some PII with existing Recipient(s). The procedure is exited.

If the test for a Recipient associated with the postal address that has the same name as the input record (step 92) is successful, the Email address in the Database that corresponds to the received data record is linked to the found Recipient (step 90, which represents case 9, above). That is, the process found a new association between an Email address that already existed in the Database and an existing Recipient, and no PII was added to the Database. The procedure is exited.

If the previous test to determine whether the Email address in the Database has a Recipient as the same name as the received data record (step 76) found a matching, existing Recipient, then the postal address in the Database is also checked for an associated Recipient with the same name as the received data record (step 89). If this test fails and the postal address is not attached to a Recipient of the same name, the postal address in the Database is linked to the existing, matching Recipient that is associated with the Email address (step 91, which represents case 10, above). That is, the process found a new association between an postal address that already existed in the Database and an existing Recipient, and no PII was added to the Database. The procedure is exited.

If both the Email address and the postal address are in the Database and are associated with Recipients that have the same name as the received data record, the procedure checks whether the postal Recipient and the Email Recipient are one and the same (step 80).

If the Recipients are not the same, the process has found an instance in which the received data record name and postal address exist and are associated with a Recipient in the Database already, and the received data record Email address also already exists in the Database, but is associated with a different Recipient who also shared the same name. The two distinct Recipients need to be merged into a single Recipient because they represent the same person (step 82, which represents Case 2, above). That is, all the PII from the received data record already exists in the Database, and the postal address was linked to a Recipient with the same name but a different Email address, and the email address was linked to a Recipient with the same name but a different postal address; therefore, the received data record indicates these currently distinct Recipients are the same person and should be merged into a single Recipient. For example, one Recipient may be the person's work Email and postal addresses, the other Recipient may be the person's home Email and postal addresses, and the received data record contains the person's home Email address and the work postal address. With the knowledge of the received data record bridging the work and home information, we can associate all the home addresses and work addresses and merge them under a single Recipient. The procedure is exited.

If the comparison of the postal and Email Recipients (step 80) is successful, the received data record is determined to be a duplicate of a Database record and no action is taken (step 86, which represents Case 1, above). That is, the received data record does not provide any information that is not already in the Database. The procedure is exited.

Figure 16:
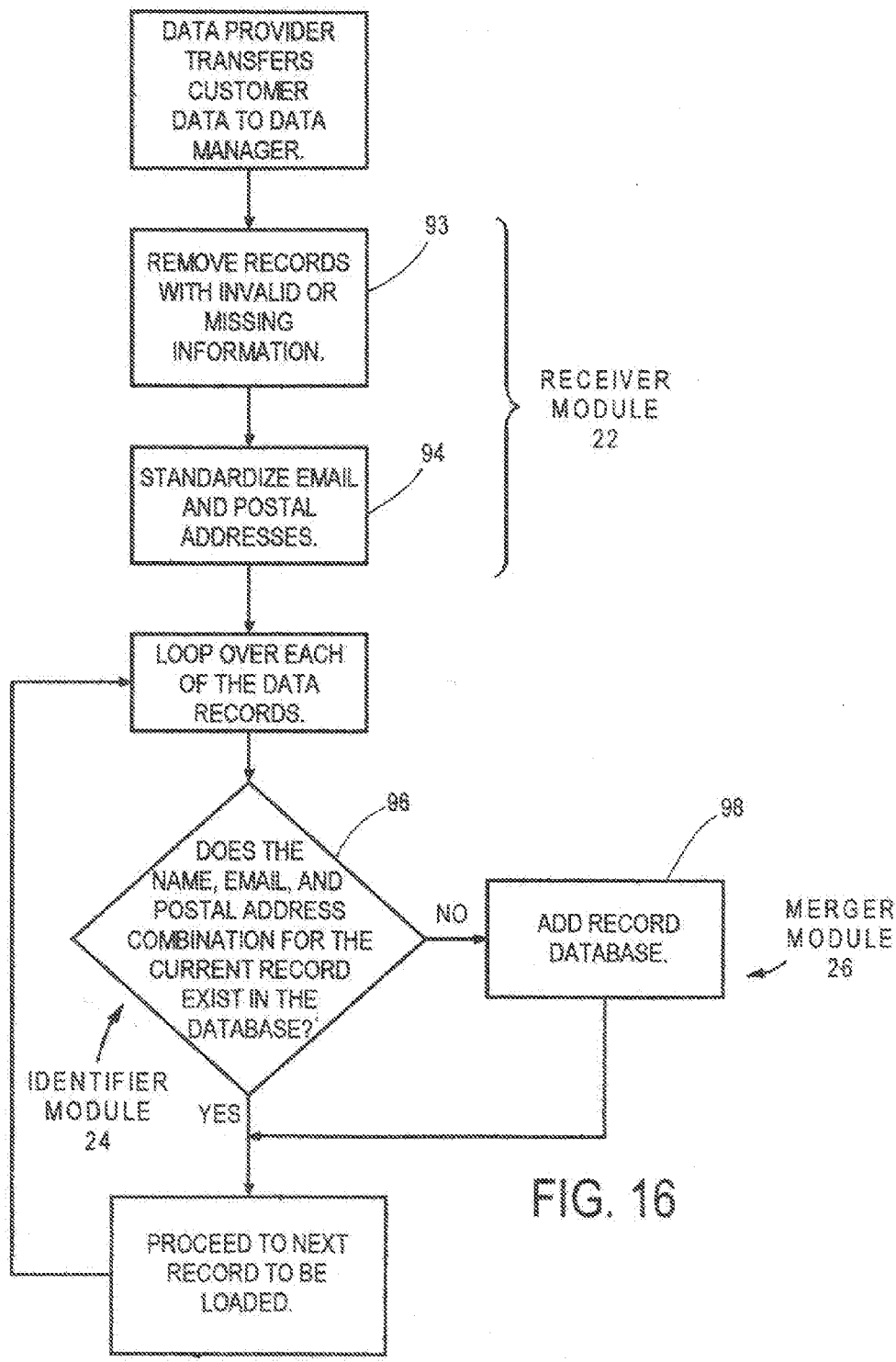
FIG. 16 illustrates the steps of a second data inputting method for embodiments where the data structure of the database consists of a single table.

FIG. 16 illustrates the steps of a second data-inputting method for embodiments of the present invention, wherein the data structure of the Database consists of a single table, where each row or record comprises at least three elements of PII: preferably, an Email address, a postal address, and a Recipient's name (for example, see FIG. 4). Each element of information may be represented by one or more fields in the table. For example, postal addresses may be comprised of the following fields: street address, city, state, and postal code. The advantage of such a simple table is the speed with which Database searching occurs, as well as ease of maintenance of the data. Received data records are preferably prepared in a standardized format (step 94) either at the Data Provider, or in the Receiver Module of the Data Manager. Each element and field is standardized, once records having missing or invalid elements are discarded (step 92) in the Reciever Module.

Such standardization (step 94) makes comparison a simple matter of comparing PII elements (i.e., a complete data record), and having a simple pass/fail test in the Identifier Module (step 96) regarding the matching of the received data versus data already in the Database. If the record is not in the Database, it is added (step 98) by data Merger Module. Otherwise, the next record is loaded and the process is repeated.

In summary, according to the present invention, the data loading/updating process achieves several functions. A data record is created in Database for a Recipient if that Recipient does not already exist in the Database. If the Recipient exists in the Database, and a received data record contains a new data element for that Recipient, the contact information is added to the data records of existing Recipient. If the contact information exists in the database, but belongs to a new Recipient, the new Recipient is created and the existing contact information is linked to that new Recipient. If the received data indicates that data records for what was previously considered to be two different Recipients actually constitute the same Recipient, those data records are merged together.

The following examples will illustrate the types of received data record entries that may be detected and how they may be stored in the Database.

FIG. 18 illustrates three exemplary tables containing received data records. The tables contain chronological data showing when the data was last updated. Table 11 of FIG. 18 shows an exemplary dataset received from a particular Data Provider on Oct. 31, 2001. Table 12 of FIG. 18 shows an exemplary data block received from the same Data Provider a month later. The time interval is not essential and can be varied according to user requirements; the month interval here was chosen merely as an illustration of the use of chronological or version data in the database.

In a first comparison of the data records in Table 11 and Table 12, postal address changes are detected between the two datasets, the changed data records having IDs of "1" and "3". The differing data records, with IDs "1" and "3" are shown in Table 13 of FIG. 18 as an "Old Postal Address" and a "New Postal Address" for the IDs "1" and "3". A name element field (entitled "Name" in the figure) is also included in Table 13. In the examples, the data records contain a field indicating the date of the data record update (entitled "Update Date" in the figure), which is not essential to the embodiment. The fields may be either searched for changes using this date element or a postal address element.

If this update date element is included in the table, searches may be restricted to existing data falling within a certain date range. For example, only those records that have a more recent update date may be examined. Otherwise, all records may be examined. According to a preferred embodiment of the present invention, the received dataset is preferably compared to a same received dataset at the two different points in time. Each field in the dataset is compared to see if the value has changed during the time interval chosen, and any changes that are detected are directly integrated into the database or preferably stored for later use in the merge process.

In the absence of the update date column, the postal address fields are preferably searched for changes in a first comparison process. In a second comparison process, the Email address fields are compared between Tables 11 and 12. Thus, for example, for data record ID 1, it is found that both the Postal Address and the Email Address have changed. For data record ID 3, only the Postal Address is changed. These identified changes are stored in the Database for later use as alternate data element to queries. For example, changed records may be incorporated into the Database using one of the methods previously described and changes in Email addresses detected in received datasets can be used to populate database tables structured like those in FIGS. 11 and 12 in which email addresses are directly associated with alternate email addresses.

Another method for populating these same tables and structuring the database is based on grouping PII of the same type together in the Database. FIG. 10 illustrates an exemplary Table 6, with the simplest form of table construction, having multiple records for a same Recipient in the same Database.

In this method, essentially, PII records are grouped because of similarities in Name and Postal Address. In the example of Table 6, there are three different Email addresses for the same Recipient.

Noting that, in the example, records have slightly different PII, as would often be the case in the real world, fuzzy logic matching techniques mentioned above can be used to look past minor differences in data. Specifically, in the example, there are slight differences in capitalization, punctuation, and even minor spelling variations, such as "Terri" versus "Terry" or "St." versus "Street". In practical implementation, it is preferable to standardize postal addresses and names and use approximate matching techniques (i.e., fuzzy logic) to identify records that pertain to the same Recipient but may have slight variations between them. Such a technique may preferably be used to examine any single database or an aggregation of databases, and the search may be done in real-time when data is needed or the data may be analyzed in advance to store alternate data elements for a Recipient.

Once multiple sets of PII for Recipients are identified by grouping, the culled results may be stored in a table showing only the associations between the Email addresses, such as the three different Email addresses for "Terry White", as shown in Table 7 of FIG. 11. In the table, the Postal Addresses are left off and the Names are standardized, also using fuzzy logic. The Names may be excluded from the table as well, but they are useful in distinguishing between multiple people using the same Email address.

Table 9 of FIG. 13 shows additional records in the same Database, basically adding to the data record shown in Table 6, FIG. 10, with additional postal addresses for "Terry White". However, since they do not share postal addresses with Table 6, they are not linked as a single record with the other "Terry White" entries. That is, if, as noted above, single records are grouped by Name and Postal Address, as shown in Table 6, FIG. 10 and Table 9, FIG. 13, then a single Recipient with multiple Postal Addresses would not be associated together into a single data record.

This limitation is not necessary and not preferable. Grouping can be done based on the alternate PII type, such as Email address. In other words, since the identifying Email address "terryw@hotmail.com" appears in both groupings, all five of these records may be linked together. Table 7 may now be expanded to include the linked data records and is shown as Table 10 in FIG. 14, which shows a table that includes all the linked records of Table 6 and Table 9. Thus, "White84@aol.com" is now associated with "terryw@hotmail.com", as well as Terry's "onebox.com" and "earthlink.net" addresses. The linking of the two groups of records also reveals that "Terry White" lives or works not only at "403 W 54th St," but also uses "1329 E 11th St" as an address.

Having discussed the methods of the present invention, the discussion will now turn to implementations of the methods. While the preferred implementation of the present invention might be as a business to business service, wherein the service provider (i.e., Data Manager) receives queries from business clients (Senders) inputting a list of data elements of one type, (e.g., Email address), to receive an output list of alternate Email addresses in return, it can be appreciated that various other implementations may employ the system and methods. For example, an alternate implementation may be a consumer-oriented white-pages-type service, wherein consumers could go to an Internet web site and enter the old Email address and receive an alternate Email addresses for that Recipient.

Optionally, as noted above, the system may send an Email to the Recipient trying to be reached and ask whether it is okay to release an Email address to the Sender.

The Data Manager may be implemented as client software that could be licensed and allow companies to analyze their own databases and internally find alternate data elements for the same person.

The foregoing methods preferably do not require installation or integration of software into the web sites or on-line systems of data partners or Data Providers. This greatly reduces the amount of work for Data Providers and thus reduces the time and costs needed to establish a partnership with Data Manager. The simplest way to gather data for use by this method is by obtaining it from companies that collect PII from people in the course of their business. For example, a company that sells software might collect PII when completing a sale and/or may allow consumers to store a personal profile at the company web site. Therefore, returning customers are able to expedite future transactions by using information they previously entered. Along with providing profile functionality, companies may provide a means for consumers to update their PII.

It can be appreciated that the present invention may be expanded to encompass PII including a wide variety of personal information, wherein a query submitting one or more elements of PII may result in outputting one or more of a plurality of alternative PII elements. For example, if a Sender wishes to find the name of company where a Recipient is employed, but only has an Email address, such as "JohnSmith@xyz.org", the Email address may be inputted as a descriptor key in the query. Assuming the database contains the Email address, the Data Manager returns, as an output, the name of the employer.

Alternatively, the invention may use artificial intelligence to enhance searching ability and allow return of an Email address, even if a Sender doesn't possess an Email address. Combinations of PII data elements may be included in a query that is then compared with similar data elements in the database then parsed and supplied to an artificial intelligence (AI) module for matching to an Email address. For example, if portions of PII data elements are known, it may be possible to ascertain the Recipient through the intelligent search of the database.

For example, assume that a company name (e.g., The ABC Block Company) an Internet domain name (e.g., xyz.org) and a last name (e.g., "Smith") are known. The Data Manager may perform a search of all of the Email address elements included in the database, by parsing the domain names from full Email addresses (i.e., all of the characters to the right of the @ symbol up to a next blank space). When a domain name match is identified, the remaining data elements are compared for a match or an equivalency for the company name and the Recipient's last name. If multiple records are identified, any records that match all three portions is then either be outputted or further processed by an additional AI module to determine a single best match based on predetermined user criteria and/or additional inputted information. In this fashion, the Sender can be provided with an Email address contact even if the Sender was not in possession of this data at the start, but had other PII.

If this functionality is desired, the Database can preferably be altered to improve searching. As is known in that art, such parsing steps comprises an additional processing step that may constitute a significant time limitation if a large Database is searched. Accordingly, parsing may be eliminated by initially storing domain names of Email addresses as a separate data element. Thus, a search may be conducted directly for domain names without the need parsing Database data upon each search.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the embodiments may be varied without departing from the spirit of the invention, and the exclusive use of all modifications which come within the scope of the description is reserved.

The preferred embodiment of the present invention may be used by businesses or persons (i.e., Senders) to find current, alternative PII for their customers, prospects, and contacts (i.e., Recipients).

The invention claimed is:

1. A computer-based system for providing alternate contact information for an entity, comprising:
   a) a data storage means for storing data;
   b) a computer database of contact information consisting of a plurality of different types of contact information for a plurality of entities, which resides in said data storage means;
   c) a first means for receiving, from a query originator comprising a person or computer program, one or more queries, each comprising at least one type of contact information for an entity, said first means being capable of communicating with said computer database;
   d) a second means for accessing and searching said computer database for different contact information, said second means being capable of communicating with said first means and with said computer database, wherein said second means:
   (d1) compares said contact information in said query to the contents of said database, and
   (d2) identifies contact information in said database related to said entity in said query by identifying contact information of a different type than was in said a query which is related to the same entity as in said query, and
   (d3) searches through said database, comparing the contents of said database with said identified contact information of a different type, and
   (d4) identifies and stores alternative contact information of the same type as said query, which is related to said entity; and
   e) a third means for returning a response to said query originator, said response comprising alternate contact information of the same type as in said query, corresponding to the same entity as in said query, and said response comprising alternate contact information which has been identified by said second means.

2. A computer-based system, as in claim 1, wherein said second means further comprises a means for repeating said searching and said identifying means, until all related alternate contact information of the type in said query for said entity is identified in said database.

3. A computer-based system, as in claim 1, wherein the contact information type of said query and the alternate contact information returned is an Email address, and said different type is a name and postal address.

4. A computer-based system according to claim 1, wherein the system further comprises a means for obtaining permission from the entity in said query, prior to the response to said query.

5. A method for obtaining alternate contact information for an entity, comprising the steps of:
   a) receiving a query consisting of entity contact information, said query having been originated by a person or computer program; and
   b) accessing a computer database of contact information of a plurality of types corresponding to a plurality of entities, said entities consisting of persons or businesses or both; and
   c) comparing said contact information in said query with the contents of said computer database; and
   d) if said contact information in said query is included in said computer database then:
   d1) identifying contact information of a different type in said computer database, which is related to said contact information in said query,
   d2) searching said contents of said computer database, using said related contact information and comparing said related contact information with said contents of said computer database, and, d3) identifying, in said computer database, alternative contact information which is of the same type as the contact information in said query and which is related to the entity in said query; and, d4) generating, storing, and returning a response to said originator of said query which includes said identified alternate contact information related to said entity in said query; and e) alternatively, if said contact information in said query is not included in said computer database then: generating, storing, and returning a response to said originator of said query indicating that alternate contact information for said entity is not included in said computer database.

6. A method, as in claim 5, further comprising the steps of:

d3.1) repeatedly searching said computer database and identifying all related contact information of the same type as in said query, using said related contact information of a different type and related alternate contact information which is of the same type as in said query, until no further related contact information for said entity of the same type as in said query can be found in said database.

7. The method according to claim 5, further comprising the step of obtaining permission from said entity, prior to said response to said query, said step comprising:

1) generating and transmitting a permission request to said entity;

2) obtaining Permission from said entity; and 3) discarding contact information from said response, if said permission is not obtained.

8. The method, according to claim 5, wherein said contact information in said query and said alternate contact information in said response is an Email address and said different type is a name and postal address.

* * * * *